(12) United States Patent
Wellton Persson

(10) Patent No.: US 7,812,823 B2
(45) Date of Patent: Oct. 12, 2010

(54) USER INTERFACE AND MEANS FOR CONTROLLING SAME

(76) Inventor: Claes Lorentz Uno Wellton Persson, Sveavägen 118, 5 TR, Stockholm (SE) S-113 50

( * ) Notice: Subject to any disclaimer, the term of this patent is extended or adjusted under 35 U.S.C. 154(b) by 231 days.

(21) Appl. No.: 10/475,087

(22) PCT Filed: Apr. 24, 2002

(86) PCT No.: PCT/SE02/00817

§ 371 (c)(1), (2), (4) Date: Oct. 24, 2003

(87) PCT Pub. No.: WO02/086692

PCT Pub. Date: Oct. 31, 2002

(65) Prior Publication Data

US 2004/0130523 A1    Jul. 8, 2004

(30) Foreign Application Priority Data

Apr. 25, 2001  (SE)  .................................... 0101489

(51) Int. Cl.
*G06F 3/02* (2006.01)
(52) U.S. Cl. ........................ 345/169; 345/168; 348/734; 715/825
(58) Field of Classification Search .................. 348/734; 340/825.69, 825.72; 715/825–829; 725/39, 725/43; 345/156–158, 168–171
See application file for complete search history.

(56) References Cited

U.S. PATENT DOCUMENTS

| 5,648,781 | A  |   | 7/1997  | Choi ............................ 341/176 |
| 5,990,868 | A  |   | 11/1999 | Frederick .................... 345/158 |
| 6,046,732 | A  | * | 4/2000  | Nishimoto ................... 345/168 |
| 6,127,941 | A  | * | 10/2000 | Van Ryzin ............. 340/825.69 |
| 6,178,338 | B1 | * | 1/2001  | Yamagishi et al. .......... 455/566 |
| 6,532,004 | B1 | * | 3/2003  | Harrison et al. ............. 345/169 |
| 6,690,392 | B1 | * | 2/2004  | Wugoski ..................... 715/744 |
| 6,741,235 | B1 | * | 5/2004  | Goren ......................... 345/173 |
| 6,747,591 | B1 | * | 6/2004  | Lilleness et al. ............ 341/176 |
| 6,765,557 | B1 | * | 7/2004  | Segal et al. .................. 345/173 |

(Continued)

FOREIGN PATENT DOCUMENTS

EP          1067784 A2      1/2001

(Continued)

*Primary Examiner*—Kimnhung Nguyen
(74) *Attorney, Agent, or Firm*—Jacobson Holman PLLC

(57) ABSTRACT

A user interface for communication equipment facilitating communication via the Internet and preferably providing other audio/video services and including a monitor or TV screen (S) for display of a user interface. The user interface comprises display of symbols (1, 2, 3, 4) resembling the keys of a keypad, each symbol including one icon symbolizing an associated service and also at least a number or symbol (e.g. **0-9;*,#) as associated with the keys of a keyboard and/or a short descriptive text for associated service. User input identified as the number/symbol displayed results in display of at least one further screen image related to chosen alternative. At least the first displayed screen (S) includes preferably at least one additional group of symbols (5, 6, 7, 8, 9**) resembling keys, extending as a vertical and/or horizontal row of keys, each key symbol preferably only including an icon and/or a short descriptive text, said group(s) preferably related to services for control and setting of parameters related to the communication equipment used.

15 Claims, 3 Drawing Sheets

U.S. PATENT DOCUMENTS

| | | | |
|---|---|---|---|
| 6,791,467 B1 * | 9/2004 | Ben-Ze'ev | 340/825.69 |
| 6,812,881 B1 * | 11/2004 | Mullaly et al. | 341/176 |
| 6,824,321 B2 * | 11/2004 | Ward et al. | 400/479 |
| 6,828,993 B1 * | 12/2004 | Hendricks et al. | 715/819 |
| 6,865,746 B1 * | 3/2005 | Herrington et al. | 725/53 |
| 6,903,728 B1 * | 6/2005 | Baker et al. | 345/169 |
| 6,918,136 B2 * | 7/2005 | Shepherd | 725/141 |
| 7,079,113 B1 * | 7/2006 | Hayes et al. | 345/158 |
| 2001/0015721 A1 * | 8/2001 | Byun et al. | 345/169 |
| 2002/0082042 A1 * | 6/2002 | Mark et al. | 455/550 |
| 2004/0066308 A1 * | 4/2004 | Sampsell | 340/825.69 |

FOREIGN PATENT DOCUMENTS

| | | |
|---|---|---|
| WO | WO99/21077 | 4/1999 |

* cited by examiner

USER INTERFACE AND MEANS FOR CONTROLLING SAME

This is a nationalization of PCT/SE02/00817 filed Apr. 24, 2002 and published in English.

FIELD OF THE INVENTION

The present invention relates to user interfaces and means for controlling same Intended for equipment arranged for communication via the Internet, preferably high speed connection of broadband type, arranged to facilitate access to, for example, music, video, e-mail functions, search functions, news programs and other existing or future services, such equipment preferably also facilitating more conventional use within the field of personal computers (PC), i.e. word processing, games, registration of data, calculations and other existing types of programs, and preferably also use as a DVD/CD player and other audio/video services. As a display unit can a monitor be used, or a conventional TV set, even though it is preferred a TV set is only used in the capacity of a monitor, i.e. the communication equipment preferably includes circuits facilitating not only digital reception of signal, but also analogue reception of conventional TV channels.

BACKGROUND OF THE INVENTION

Services and functions of the above type are utilized in a continuously increasing rate, and the rapid expansion of communication networks which accept high speeds of communication, more popularly named broadband networks, increases the number of users that can get access to video, audio and other services from the Internet with picture and sound of high quality. Access to these services is normally obtained by a conventional personal computer, equipped with a network card and/or a modem suitable for chosen type of communication network. Speakers and monitor connected to the computer can be used to give the user access to video and audio, and with a suitable video circuit card it is also possible to connect a TV to the computer, e.g. to show "streaming video" transferred via Internet. Such a TV may also have a direct connection to the communication network, when same is of type cable TV, and in a conventional way receive the TV channels transmitted on various frequencies.

Today used equipment facilitating communication to/from the Internet is thus primarily based on use of conventional personal computers (PC), and require a certain technical knowledge of the user. As a result, many users do not feel that they have the required data experience to start using the services already available, i.e. users connected to a cable TV network only use same for reception of TV programs, whereas the network may also offer broadband access to the Internet.

The main reason for this is that a user, also old age people with little experience of computer technology, finds it easy to handle the TV functions, e.g. by means of a handheld remote control unit, only requiring input of desired TV channel by depression of the appropriate key having a key number matching the channel to be watched. A computer interface is adapted for input via a mouse or a keyboard, whereby a cursor can be moved around the screen to desired program icon, and actuating said icon by a mouse clicking operation, or by depressing the "ENTER" key on a keyboard.

A conventional and common user interface of today is thus a conventional computer interface, based on a screen having Icons for various functions, and with a user moving a cursor to desired icon (or selected area of the screen) and performing an acceptance operation, e.g. by clicking a mouse, in order to start chosen operation.

For example, US. Pat. No. 5,648,781 discloses a remote control comprising a trackball for controlling the movement of a pointer (cursor) to select a displayed icon, and how this icon can be selected by a command means. Alternatively, a remote keyboard can also be used for this purpose, e.g. as disclosed in WO 99/21077. Further examples of control means are disclosed in US. Pat. No. 5,990,868, showing how a trackball can be arranged in a keyboard, or a handheld control unit, whereby the movement of a cursor can be controlled, and also acceptance of a desired cursor position can be communicated.

All the above mentioned devices can be used to control a cursor and make same take up a position in relation to icons shown on a monitor screen, and acceptance of a desired position can also be communicated. However, this method of guiding the cursor to a position over a chosen icon, and thereafter communicating acceptance of such a position, may obviously feel complicated for a person lacking computer experience.

SUMMARY OF THE INVENTION

The above-mentioned as well as other shortcomings are addressed by the present invention, which will be understood by reading and studying the following specification. The invention describes a novel user interface for equipment intended for communication via the Internet. The interface is adapted for easy use by users without computer experience, and makes selection of individual groups of services available through Internet extremely easy, e.g. selection of music as program category, followed by type of music, which can be followed by a further selection, such as music band, singer, title etc.

None of these selection operations require the somewhat difficult maneuvering of a cursor or pointer around the screen of a monitor or TV, and can therefore be performed without difficulty by any person. The user interface is self-guiding, i.e. requires no previous instruction or skill, not even for a first time user.

The novel user interface according to the present invention is preferably operated by a remote control device, and a preferred embodiment of a handheld remote control device is also disclosed, interacting with the user interface of the invention. With regard to certain operations, e.g. input of e-mail messages, a remote keyboard can advantageously be used for text input.

Still further aspects, advantages and embodiments of the invention will become apparent by reference to the drawings and by reading the following detailed description,

DETAILED DESCRIPTION OF THE INVENTION

In the following detailed description of preferred embodiments, reference is being made to the accompanying drawings which form part hereof, and in which is shown by way of illustration specific preferred embodiments in which the invention may be practised. These embodiments are described in sufficient detail to enable those skilled in the art to practice the invention, and it is t be understood that other embodiments may be utilized and that modifications can be made without departing from the spirit and scope of the invention. The following description is, therefore, not to be taken in a limiting sense, and the scope of the present invention is defined only by the appended claims.

Figure 1:
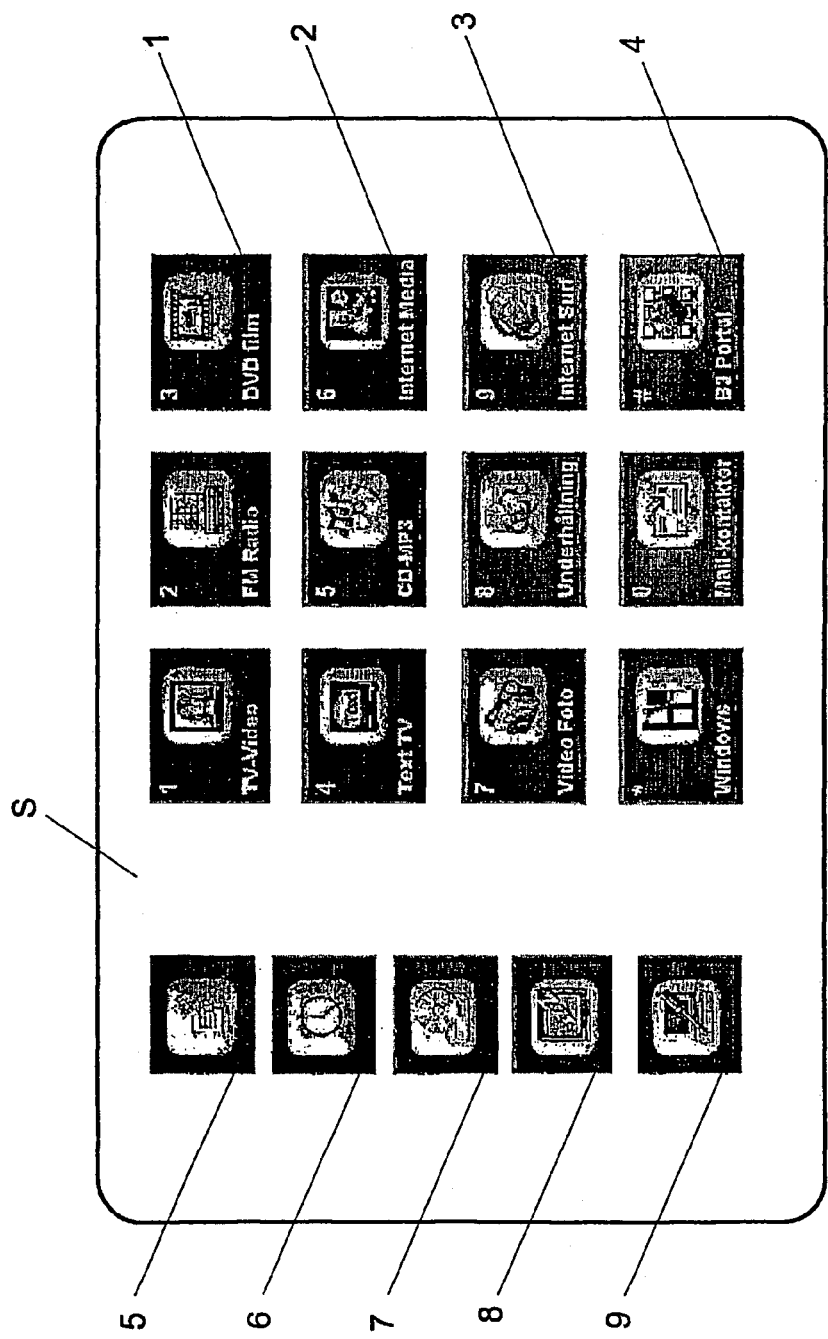
FIG. 1 is a view of a screen showing an example of a first screen shown to a user with a number of alternative services from which the user can make a choice.

Referring first to FIG. 1, a monitor or TV screen is shown, disclosing an example of the user interface according to the present invention. It should be understood that this monitor or TV is connected to a device for communication with the Internet, comprising parts that normally make up a personal computer, i.e. a motherboard with a microprocessor and associated circuits, same also including memory circuits, graphics, video and audio circuits, and preferably also at least a hard disk and a DVD/CD player. Said device may also include a circuit card facilitating TV reception, a network card or other circuits facilitating connection to Internet via an internal or external cable modem or similar, having a connection to Internet, preferably a broadband connection.

The described device may thus be a PC, but a specifically designed unit for Internet communication is preferred, having a slim-line design and with outputs for audio to a high quality loudspeaker system and also audio and/or video outputs for connection of a TV set or a monitor. Other inputs/outputs may also be arranged, and in particular for wireless communication with remote control devices. Examples of further inputs/outputs that may be arranged are connectors for parallel or serial communication, and also for wireless communication with external devices, e.g. a printer.

When a communication device of the above preferred type has been connected to the Internet, and initial configuration has been performed to secure Internet access, the device is preferably pre-configured with a program stored on the hard disk (or PROM/EPROM) which results in a start screen when the device is switched on.

An example of such a start screen S as displayed to the user by a connected monitor, or TV, is shown in FIG. 1. Available alternatives are shown as two groups of "buttons", each button in a first group 1, 2, 3, 4 of twelve shown as a combination of icons, a specific number (or symbol) for each icon, and also a short describing text (in Swedish). A list of alternatives are also shown in a second group of five "buttons" 5, 6, 7, 8, 9 forming a vertical column of "buttons" in the left part of the screen. In this example, the latter group only disclose icons, i.e. without text or numerals/symbols.

The icons shown in the first group disclose the type of service associated with each "button", and the numerals 0-9 and the symbols "*" and "#" correspond to correspondingly marked buttons in a remote control used by a user to select desired alternative. The text shown in Swedish is not really necessary, but is preferred to be shown in the language of a user as further assistance to a person not well acquainted with conventional use of icons in computer technology. The "buttons" shown in the second group are related to services not really associated with the Internet, e.g. the "button" 5 gives access to a help screen, 6 is related to clock functions (alarm, set time, set start time etc.), 7 is related to functions with regard to a DVD or CD player, 8 puts the equipment into a stand-bye or snooze state, and 9 is intended for access to services related to input of system specific data required for certain operations.

The displayed configuration of the "buttons" on the screen should in a preferred embodiment substantially correspond to the configuration of the buttons in the remote control used to operate the system, whereby a user extremely easy can make the choice of service, since the display on the screen would correspond to the buttons of the remote control unit.

As discussed later, the remote control unit can also include further control buttons, e.g. for control of audio output and quality, on/off switching, or any other function. The remote control unit shown in FIG. 3 thus includes a number of additional buttons, apart from those corresponding to the display shown in FIG. 1.

Figure 2:
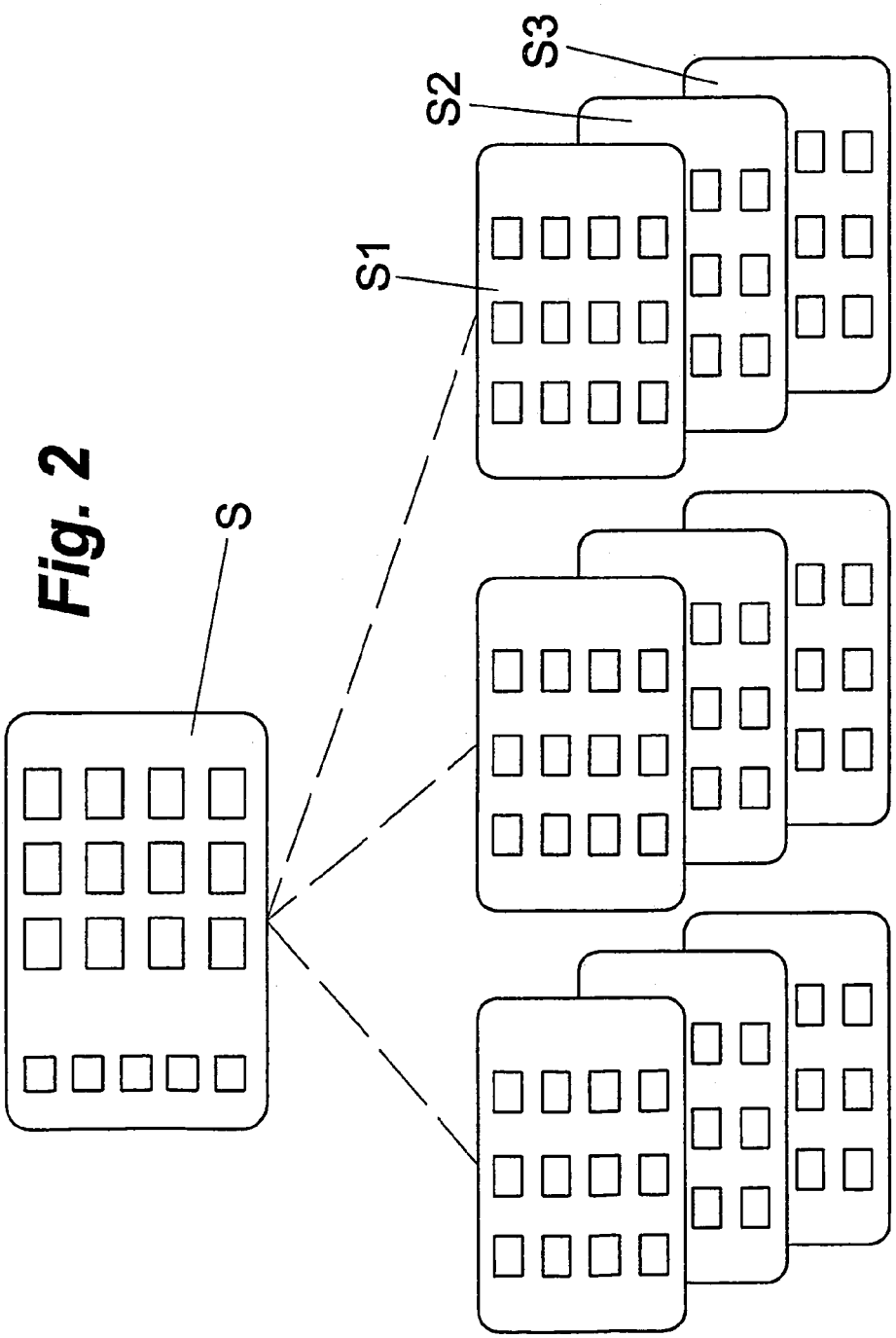
FIG. 2 is a schematic view of how an Initially made choice can be followed by subsequent choices within the category chosen initially.

A major group of services can be controlled entirely by use of a handheld remote control unit, i.e. services that do not require user input of words or letters. For example, user input of numeral "1" (TV-Video) results In display of a first subscreen S1, giving a first set of alternatives to a user, e.g. TV and a number of sources for streaming video obtainable via the Internet. The sources of video obtainable via Internet can be grouped into different types of programs, e.g. sport, film, music videos etc. By depressing desired number for the type of program desired, a new subscreen S2 is shown, once again limiting the choices to the type of programs already selected, e.g. if TV was selected, displaying channel choices available. The system with subscreens is schematically illustrated in FIG. 2, showing three groups of subscreens, each group comprising of three screens (S1-S3). The number of subscreens may of course vary from one to any other number.

The above discussed method of making a choice would obviously be suitable for many other services, such as selection of radio channels, DVD film, Internet media etc., and could also be applied for reading e-mail received. The control unit is preferably also arranged to facilitate text input in a fashion similar to the way In which SMS messages are inputted for mobile telephones, i.e. by repeated depression of key "1", alternative input of the letters "a", "b" and "c" could be accomplished, whereas key "2" could, for example, be used for the letters "d", "e" and "f".

However, when a user selects a service requiring input of large text volumes, or when the communication equipment is used as a PC, a keyboard can be used, and a keyboard of remote type is preferred, i.e. not requiring cable connection. Assuming that the user from an e-mail menu selects the alternative "Send e-mail" by the handheld remote control, a screen appears for entering the e-mail. The user can now write the e-mail by means of the keyboard in a conventional way, and when the e-mail has been completed, it can be sent via the Internet. This method, i.e. using a keyboard, can obviously also be used for surfing the Internet, since such an operation requires text input. A keyboard is obviously also preferred for word processing operations.

In other words, most operations can be performed with use of a handheld remote control unit, and operations requiring text input can be performed by use of the keyboard.

Since substantially all operations controlled by the handheld remote control unit preferably are based on screen displays having a layout with "buttons" that are easily identified and which can be related to the buttons on the remote control unit, operation is extremely easy to understand and user friendly.

Figure 3:
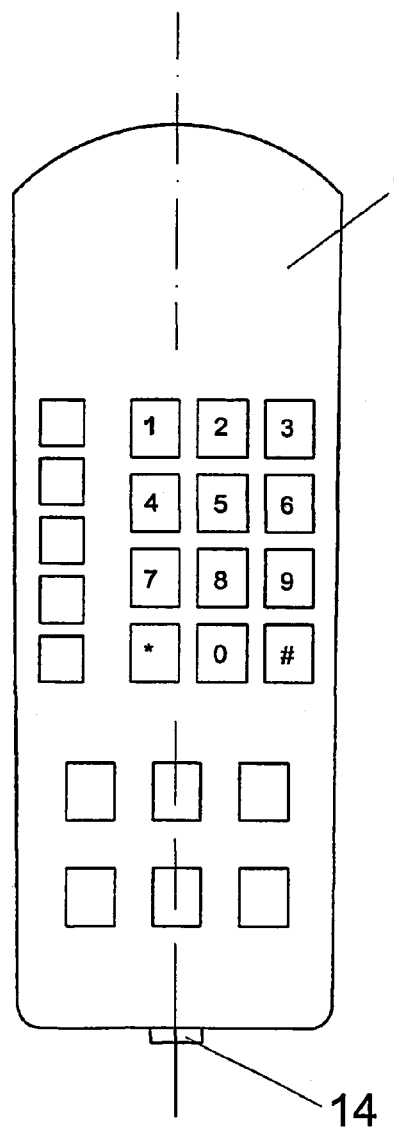
FIG. 3 is a view of an embodiment of a handheld remote control unit for effecting choice of program category, and subsequently following choices.
Figure 4:
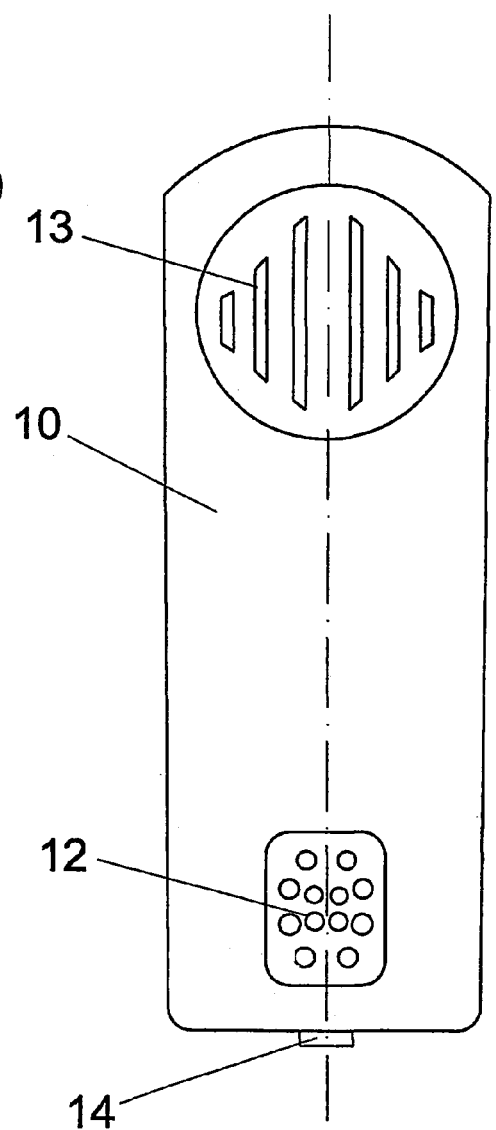
FIG. 4 is a view of the side opposite to the keypad of the remote control unit.

A remote control unit 10 is schematically shown in FIG. 3, and this unit may use any known type of wireless communication method, e.g. RF or IR. Bluetooth is an example of a RF system that can be used. The control unit 10 includes a keypad 11 having the configuration of at least a group of the buttons preferably substantially corresponding the configuration displayed on the screen of the monitor or TV used. The communication device with the Internet obviously also includes a receiver for the type of wireless transmission used. Since the remote control unit 10 can be arranged to communicate with a wireless transmission system facilitating two-way communication, e.g. Bluetooth, the control unit 10 may also include a microphone 12 and a speaker 13, e.g. on the side opposed to the keypad, as shown in FIG. 4. This makes it possible for a user to listen to the audio without disturbing anybody, and the inclusion of a microphone 12 makes it possible to use the handheld remote control unit for "chat" operation via the Internet, or for IP telephone services, and obviously also for video conferences or contacts, provided that a video camera is connected to the communication equipment used.

This makes the handheld remote control unit 10 even more versatile, and increases simple access to services available via the Internet. The handheld remote control unit 10 can also be arranged having a contact 14 for attachment of a set of headphones, whereby a user can enjoy stereo audio transmissions in complete privacy.

The user interface according to the present invention has obvious advantages when compared with conventional interfaces, requiring movement of a cursor or a pointer to a desired icon. There are obviously also other advantages, since the audio level, and other audio adjustments, can be preset to existing output levels for different types of programs and activities.

Previously described combination of a handheld remote unit and a keyboard to facilitate both control of the user interface and text input may also according to an alternative embodiment be handled by use of a Personal Digital Assistant (PDA) equipped for wireless communication, e.g. having a Bluetooth communication module (and with the device used for communication with Internet also equipped with a similar communication interface).

The PDA can be arranged to display the alternatives shown on the screen, or the user may enter desired alternative by use of a stylus and by entering the number of desired service. Furthermore, a PDA can also be used not only for this purpose, but a user may also use same for entering text, i.e. in the same "quick text format" as normally used for entering text to be stored in the PDA.

To use the interface according to the present invention with a PDA as control means makes it also possible for the controlled equipment to recognize when the user and the PDA approaches the communication equipment controlled by the PDA, and this feature can be used to start up said equipment from a stand-by or "snooze" condition. This feature can also be used for recognizing the identity of a person staying as a guest in a hotel room. When entering the hotel room, the communication equipment "recognizes" the person, i.e. the home pages, music, e-mail address etc. related to the guest, and the equipment can instantly display the "favourite pages" for such a person, or check for incoming e-mail, or play the type of music that this guest prefers.

As a further alternative control means may also mobile telephones be used, provided that same are equipped for communication via IR or RF with the communication equipment to be controlled. Such telephones can not only be used for selection of desired service from the menus shown on the screen of the monitor or TV used, but also for input of text, provided that the mobile telephone is of the type facilitating text communication, e.g. transmission of SMS messages.

Since the communication equipment used and controlled includes all hardware normally included in a conventional PC, same may obviously include installed PC programs, which can be used by a user, preferably operating a keyboard and a pointing device, e.g. a mouse. Access to a conventional PC start-up screen Is indicated as possible In FIG. 1 by the button symbol marked "Windows". This text is obviously not to be considered as a restriction to any particular operating system (OS), i.e. any other OS can obviously be used, e.g. LINUX.

At least some of the subscreens following a start screen should obviously accept user modification, i.e. the user should be able to select favourite sources for music, information, etc., and to store this information. Such stored information should be displayed in a format facilitating access by a user using the previously described types of input, i.e. without the need to move a cursor or a pointer around the screen.

Described and shown embodiments of the present Invention can obviously also be modified to meet user or manufacturer requirements, and are thus only intended to serve as examples enabling a person skilled in the art to make any modifications required to obtain required and/or desired functions and services.

INDUSTRIAL APPLICABILITY

The user interface and the various embodiments of control means according to the present invention constitutes a major improvement of present interfaces, based on the movement of a cursor or pointer over a screen, and with selection of a desired icon by a confirming instruction, e.g. by clicking a mouse.

Furthermore, the user interface makes it extremely easy for non-skilled users to obtain access to various types of Internet services, as well as making a choice from TV channels, CD and DVD (audio and/or video).

The possibility to use various types of control units with the Interface makes it easy to obtain dual function control means, i.e. control means that also may be used for other purposes, e.g. a PDA or a mobile telephone.

The invention claimed is:

1. A user interface control system comprising:
    a handheld remote control unit to control a user interface, the remote control unit having a keypad with a plurality of buttons arranged thereon, and the remote control unit being separated from the user interface; and
    the user interface for a communication equipment facilitating communication via the Internet and including a monitor or TV for display of the user interface, the user interface including display of a group of icons on a main screen, said group of icons symbolizing associated services and including at least a number or symbol and a short descriptive text for one of the associated services;
    the main screen of available services being followed by one or more subsequently following subscreens for each service, arranged to narrow down a choice made into subsequently following alternatives for chosen service, the subscreen also having a display adapted to keyed input of selected choice; and
    the group of icons being positioned on the main screen or the subscreen in a layout configuration substantially corresponding to a layout arrangement of the plurality of the buttons on the keypad of the handheld remote control unit.

2. The user interface control system according to claim 1, wherein the user interface includes at least one additional group of icons related to control and setting of parameters of the communication equipment.

3. The user interface control system according to claim 2, wherein said at least one additional group of icons are arranged as a vertical column or a horizontal row.

4. The user interface control system according to claim 1, wherein the user interface is controlled by a PDA (Personal Digital Assistant) equipped for wireless communication with the communication equipment.

5. The user interface control system according to claim 1, wherein the user interface is controlled by a keypad of a mobile telephone, equipped for wireless communication with the communication equipment.

6. The user interface control system according to claim 1, wherein the handheld remote control unit for selection from a screen display of available services is arranged to facilitate two-way wireless audio communication with the communication equipment, and said remote control unit includes a microphone and a loudspeaker.

7. The user interface control system according to claim 6, wherein the microphone and the speaker of the handheld remote control unit are located on a side that is opposite to the keypad.

8. The user interface control system according to claim 1, wherein information displayed in at least some of the subscreens, or the main screen, is modified by a user to suit individual preferences.

9. The user interface control system according to claim 1, wherein audio output for different types of services is user modified and stored.

10. The user interface control system according to claim 1, wherein input of text information from the user is performed using a PDA, a keyboard, or the handheld remote control unit by repeated depression of keys.

11. The user interface control system according to claim 1, wherein there is no cable connection between the user interface and the handheld remote control unit.

12. The user interface control system according to claim 11, wherein the user interface and the handheld remote control unit communicate through a wireless communication method.

13. The user interface control system according to claim 12, wherein the wireless communication method is a method based on radio frequency (RF) or infrared (IR).

14. The user interface control system according to claim 1, wherein the group of icons positioned on both the main screen and the subscreen are in a layout substantially corresponding to a layout of the plurality of the buttons on the keypad of the handheld remote control unit.

15. A user interface for a communication equipment facilitating communication via the Internet, said user interface comprising a monitor or TV for display of the user interface, the user interface including display of a group of icons on a main screen, said group of icons symbolizing associated services and including at least a number or symbol and a short descriptive text for one of the associated services;

the main screen of available services being followed by one or more subsequently following subscreens for each service, arranged to narrow down a choice made into subsequently following alternatives for chosen service, the subscreen also having a display adapted to keyed input of selected choice; and the user interface being controlled by a handheld remote control unit having a keypad which at least partly has a layout configuration substantially corresponding to a layout arrangement of the group of icons on the main screen or the subscreen of the user interface.

* * * * *